United States Patent
Smith

(10) Patent No.: US 10,064,126 B2
(45) Date of Patent: Aug. 28, 2018

(54) IDENTIFICATION OF ACCESS POINTS IN WLAN COMMUNICATION

(71) Applicant: SR Technologies, Inc., Davie, FL (US)

(72) Inventor: Graham K. Smith, Boca Raton, FL (US)

(73) Assignee: SR Technologies, Inc., Davie, FL (US)

( * ) Notice: Subject to any disclaimer, the term of this patent is extended or adjusted under 35 U.S.C. 154(b) by 60 days.

(21) Appl. No.: 15/444,764

(22) Filed: Feb. 28, 2017

(65) Prior Publication Data

US 2017/0257820 A1    Sep. 7, 2017

Related U.S. Application Data

(60) Provisional application No. 62/301,919, filed on Mar. 1, 2016.

(51) Int. Cl.
*H04W 48/16* (2009.01)
*H04L 12/26* (2006.01)
*H04W 84/12* (2009.01)

(52) U.S. Cl.
CPC ............. *H04W 48/16* (2013.01); *H04L 43/18* (2013.01); *H04W 84/12* (2013.01)

(58) Field of Classification Search
CPC ........ H04W 48/16; H04W 84/12; H04L 43/18
See application file for complete search history.

(56) References Cited

U.S. PATENT DOCUMENTS

| | | | | |
|---|---|---|---|---|
| 2007/0021126 A1* | 1/2007 | Nanda | ................... | H04W 48/16 455/456.1 |
| 2007/0183375 A1* | 8/2007 | Tiwari | ................... | H04L 63/101 370/338 |
| 2008/0052384 A1* | 2/2008 | Marl | ................... | H04L 12/2807 709/223 |
| 2010/0303047 A1* | 12/2010 | Ibrahim | ................... | H04W 4/02 370/338 |
| 2013/0225165 A1* | 8/2013 | Das | ................... | H04W 48/16 455/434 |
| 2014/0313983 A1* | 10/2014 | Onno | ................... | H04L 63/105 370/328 |

* cited by examiner

*Primary Examiner* — Min Jung
(74) *Attorney, Agent, or Firm* — Christopher & Weisberg, P.A.

(57) ABSTRACT

A method and a node identification system for identifying at least one unknown access point in a communications network using details related to at least one known access point and organization of the details related to the at least one known access point. The method includes capturing details related to the at least one unknown access point and identifying an organization of the captured details related to the at least one unknown access point, comparing the details related to the at least one known access point and the organization of the details related to the at least one known access point with the captured details related to the at least one unknown access point and the organization of the captured details related to the at least one unknown access point, and determining a type of the at least one unknown access point based on the comparing.

18 Claims, 13 Drawing Sheets

⊞ Frame 275: 297 bytes on wire (2376 bits), 297 bytes captured (2376 bits) on interface 0
⊞ Radio tap Header v0, Length 26
⊟ IEEE 802.11 Beacon frame, Flags: ........c
    Type/Subtype: Beacon frame (0x0008)
  ⊞ Frame Control Field: 0x8000
    .000 0000 0000 0000 = Duration: 0 microseconds
    Receiver address: Broadcast (ff:ff:ff:ff:ff:ff)
    Destination address:       f:ff:ff:ff)
    Transmitter address: AsustekC_79:2b:7c (54:a0:50:79:2b:7c)
    Source address: AsustekC_79:2b:7c (54:a0:50:79:2b:7c)
    BSS ID: AsustekC_79:2b:7c (54:a0:50:79:2b:7c)
    Fragment number: 0
    Sequence number: 3979
  ⊞ Frame check sequence: 0x0b031ba2 [correct]
⊟ IEEE 802.11 wireless LAN management frame
  ⊟ Fixed parameters (12 bytes)
      Timestamp: 0x0000004d704ac143
      Beacon Interval: 0.102400 [seconds]
    ⊟ Capabilities Information: 0x0c01
  ⊟ Tagged Parameters
    ⊟ Tag: SSID parameter set: Tundra Internet Sim
    ⊟ Tag: Supported Rates 1(B), 2(B), 5.5(B), 11(B), 9, 18, 36, 54, [Mbit/sec]
    ⊟ Tag: DS parameter set: Current Channel: 3
    ⊟ Tag: Extended Supported Rates 6, 12, 24, 48, [Mbit/sec]
    ⊟ Tag: Country Information: Country Code US, Environment any
    ⊟ Tag: AP Channel Report: Operating Class 32, Channel List: 1, 2, 3, 4, 5, 6, 7,
    ⊟ Tag: AP Channel Report: Operating Class 33, Channel List: 5, 6, 7, 8, 9, 10, 11,
    ⊟ Tag: Traffic Indication Map (TIM): DTIM 0 of 0 bitmap
    ⊟ Tag: Vendor Specific: Microsoft: WPS
    ⊟ Tag: ERP Information
    ⊟ Tag: HT Capabilities (802.11n D1.10)
    ⊟ Tag: HT Information (802.11n D1.10)
    ⊟ Tag: Overlapping BSS Scan Parameters : Undecoded
    ⊟ Tag: Extended Capabilities (1 octet)
    ⊟ Tag: Vendor Specific: Microsoft: WMM/WME: Parameter Element
    ⊟ Tag: QBSS Load Element 802.11e CCA Version
    ⊟ Tag: Vendor Specific: "R..."

(Prior Art)
*FIG. 3*

☐ Tagged Parameters
   ⊞ Tag: SSID parameter set: Tundra Internet Sim
   ⊞ Tag: Supported Rates 1(B), 2(B), 5.5(B), 11(B), 9, 18, 36, 54, [Mbit/sec]
   ⊞ Tag: DS parameter set: Current Channel: 3
   ⊞ Tag: Extended Supported Rates 6, 12, 24, 48, [Mbit/sec]
   ⊞ Tag: Country Information: Country Code US, Environment any
   ⊞ Tag: AP Channel Report: Operating Class 32, Channel List: 1, 2, 3, 4, 5, 6, 7,
   ⊞ Tag: AP Channel Report: Operating Class 33, Channel List: 5, 6, 7, 8, 9, 10, 11,
   ⊞ Tag: Traffic Indication Map (TIM): DTIM 0 of 0 bitmap
   ⊞ Tag: Vendor Specific: Microsof: WPS
   ⊞ Tag: ERP Information
   ☐ Tag: HT Capabilities (802.11n D1.10)
      Tag Number: HT Capabilities (802.11n D1.10) (45)
      Tag length: 26
     ⊞ HT Capabilities Info: 0x11ee
     ⊞ A-MPDU Parameters: 0x17
     ☐ Rx Supported Modulation and Coding Scheme Set: MCS Set
       ☐ Rx Modulation and Coding Scheme (one bit per modulation): 2 spatial streams
         .... .... .... .... .... .... 1111 1111 = Rx Bitmask Bits 0-7: 0x000000ff
         .... .... .... .... 1111 1111 .... .... = Rx Bitmask Bits 8-15: 0x000000ff
         .... .... 0000 0000 .... .... .... .... = Rx Bitmask Bits 16-23: 0x000000ff
         0000 0000 .... .... .... .... .... .... = Rx Bitmask Bits 24-31: 0x000000ff
         .... .... .... .... .... .... .... ...1 = Rx Bitmask Bits 32: 0x000000ff
         .... .... .... .... .... .... .000 000. = Rx Bitmask Bits 33-38: 0x000000ff
         .... .... ...00000 0000 0000 0... .... = Rx Bitmask Bits 39-52: 0x000000ff
         ...0 0000 0000 0000 0000 0000 000. .... = Rx Bitmask Bits 53-76: 0x000000ff
         .... ..00 0000 0000 = Highest Supported Data Rate: 0x0000
         .... .... .... ...0 = Tx Supported MCS Set: Not Defined
         .... .... .... ..0. = Tx and Rx MCS Set: Equal
         .... .... .... 00.. = Maximum Number of Tx Spatial Streams Supported:
         .... .... ...0 .... = Unequal Modulation: Not Supported   0X0000, Tx MCS Set
     ⊞ HT Extended Capabilities: 0x0c00
     ⊞ Transmit Beam Forming (TxBF) Capabilities: 0x00000000
     ⊞ Antenna Selection (ASEL) Capabilities: 0x00
   ☐ Tag: HT Information (802.11n D110)
      Tag Number: HT Information (802.11n D1.10) (61)
      Tag length: 22
     ⊞ HT Information Subset (1 of 3): 0x05
     ⊞ HT Information Subset (2 of 3): 0x0000
     ⊞ HT Information Subset (3 of 3): 0x0000
     ⊞ Rx Supported Modulation and Coding Scheme Set: Basic MCS Set
   ⊞ Tag: Overlapping BSS Scan Parameters : Undecoded
   ⊞ Tag: Extended Capabilities (1 octet)
   ⊞ Tag: Vendor Specific: Microsof: WMM/WME: Parameter Element
   ⊞ Tag: QBSS Load Element 802.11e CCA Version
   ⊞ Tag: Vendor Specific: "R..."

(Prior Art)

*FIG. 4*

| KNOWN APs | | | |
|---|---|---|---|
| AP Model | A | B | C |
| Chipset | R1 | R2 | R3 |
| OUI | T... | T... | T... |
| VS Chipset | R... | R... | R... |
| MODES data | 7000000 | 4000000 | 7000000 |
| Number Spatial Streams | b/g/n | b/g/n | b/g/n |
| Capabilities | 2 | 2 | 2 |
| Radio Measurements | 0x0401 | 0x0421 | 0x0c01 |
| APSD | 0 | 0 | 0 |
| Short Time Slot | 1 | 1 | 1 |
| Spectrum Management | 0 | 1 | 0 |
| Short Preamble | 0 | 1 | 0 |
| WEB Support | 0 | 0 | 0 |
| HT Capabilities | 0x01ec | 0x118e | 0x11ee |
| DSS/CCK mode in 40MHz | 0 | 1 | 0 |
| Max A-MSDU 7935B | 0 | 1 | 1 |
| HT Rx STBC SS | 1 | 0 | 0 |
| HT Tx STBC | 1 | 1 | 1 |
| HT Short GI for 40MHz | 1 | 0 | 1 |
| HT Short GI for 20MHz | 1 | 0 | 1 |
| HT Green Field | 0 | 0 | 0 |
| SM Power Save Disabled | 1 | 1 | 1 |
| HT Support Channel Width | 0 | 0 | 0 |
| HT LDPC Coding | 0 | 0 | 0 |
| HT Extended Capabilities | 0x0c00 | 0x0c00 | 0x0c00 |
| Additional Capabilities Info | 0x00 | 0x05 | 0x07 |
| Additional Capabilities Info | 0x0000 | 0x0000 | 0x0000 |
| Pre-n-HT Capabilities | 0x01ec | 0x118e | |
| A-MPDU | 0x17 | 0x03 | 0x17 |
| MPDU Density | 5 | 0 | 5 |
| WMM | 0x85 | 0x80 | 0x84 |
| U-ASPD Enabled | 1 | 1 | 1 |
| WPS | 1 | 1 | 1 |

| UNKNOWN APs | | | | |
|---|---|---|---|---|
| SSID | AAA | BBB | CCC | DDD |
| | As | As | As | As |
| | R... | R... | R... | R... |
| | 7000000 | 7000000 | 7000000 | 7000000 |
| | b/g/n | b/g/n | b/g/n | b/g/n |
| | 2 | 2 | 2 | 2 |
| | 0x0c01 | 0x0c01 | 0x0c01 | 0x0c11 |
| | 0 | 0 | 0 | 0 |
| | 1 | 1 | 1 | 1 |
| | 0 | 0 | 0 | 0 |
| | 0 | 0 | 0 | 0 |
| | 0 | 0 | 0 | 0 |
| | 0x11ee | 0x11ee | 0x11ee | 0x11ee |
| | 0 | 0 | 0 | 0 |
| | 1 | 1 | 1 | 1 |
| | 0 | 0 | 0 | 0 |
| | 1 | 1 | 1 | 1 |
| | 1 | 1 | 1 | 1 |
| | 1 | 1 | 1 | 1 |
| | 0 | 0 | 0 | 0 |
| | 1 | 1 | 1 | 1 |
| | 0 | 0 | 0 | 0 |
| | 0 | 0 | 0 | 0 |
| | 0x0c00 | 0x0c00 | 0x0c00 | 0x0c00 |
| | 0x05 | 0x05 | 0x05 | 0x00 |
| | 0x0000 | 0x0000 | 0x0000 | 0x0001 |
| | | | | |
| | 0x17 | 0x17 | 0x17 | 0x17 |
| | 5 | 5 | 5 | 5 |
| | 0x80 | 0x80 | 0x80 | 0x80 |
| | 1 | 1 | 1 | 1 |

FIG. 8

| KNOWN APs | | | |
|---|---|---|---|
| AP Model | A | B | C |
| Chipset | R1 | R2 | R3 |

| OUI | T | T | AC |
|---|---|---|---|
| VS Chipset | R | R | R |

| Beacon Order | SSID | SSID | SSID |
|---|---|---|---|
| | Supported Rates | Supported Rates | Supported Rates |
| | DS Parameter Set | DS Parameter Set | DS Parameter Set |
| | Extended Supported Rates | Extended Supported Rates | Extended Supported Rates |
| | TIM | Country Information | Country Information |
| | ERP Information 2a | AP Channel Report Class 32 | AP Channel Report Class 32 |
| | HT Capabilities | AP Channel Report Class 33 | AP Channel Report Class 33 |
| | HT Information | TIM | TIM |
| | Extended Capabilities | ERP Information 2a | VS Microsoft WPS |
| | VS Microsoft WMM | HT Capabilities | ERP Information 2a |
| | QBSS Load Element | HT Information | HT Capabilities |
| | VA Epigram 802.11n D1.10 | Extended Capabilities | HT Information |
| | VA Epigram 802.11n D1.00 | VS Microsoft WMM | QBSS Load Parameters |
| | VS RalinkTe | QBSS Load Element | Extended Capabilities |
| | | VS Epigram 802.11n D1.10 | VS Microsoft WMM |
| | | VS Epigram 802.11n D1.00 | QBSS Load Element |
| | | VS RalinkTe | VS RalinkTe |

| UNKNOWN APs | | | |
|---|---|---|---|
| QBSS Scan Element | As | As | As |
| | R | R | R |

| SSID | SSID | SSID | SSID |
|---|---|---|---|
| Supported Rates | Supported Rates | Supported Rates | Supported Rates |
| DS Parameter Set | DS Parameter Set | DS Parameter Set | DS Parameter Set |
| Extended Supported Rates | Extended Supported Rates | Extended Supported Rates | Extended Supported Rates |
| Country Information | Country information | Country Information | Country Information |
| AP Channel Report Class 32 | AP Channel Report Class 32 | AP Channel Report Class 32 | AP Channel Report Class 32 |
| AP Channel Report Class 33 | AP Channel Report Class 33 | AP Channel Report Class 33 | AP Channel Report Class 33 |
| TIM | TIM | TIM | TIM |
| VS Microsoft WPS | VS Microsoft WPS | VS Microsoft WPS | VS Microsoft WPS |
| ERP Information 2a | ERP Information 2a | ERP Information 2a | ERP Information 2a |
| HT Capabilities | HT Capabilities | HT Capabilities | HT Capabilities |
| HT Information | HT Information | HT Information | HT Information |
| QBSS Scan Element | QBSS Scan Element | QBSS Scan Element | QBSS Scan Element |
| Extended Capabilities | Extended Capabilities | Extended Capabilities | Extended Capabilities |
| VS Microsoft WMM | VS Microsoft WMM | VS Microsoft WMM | RSN |
| QBSS Load Element | QBSS Load Element | QBSS Load Element | VS Microsoft WMM |
| VS RalinkTe | VS RalinkTe | VS RalinkTe | QBSS Load Element |

| | KNOWN APs | | | | | | UNKNOWN APs | | |
|---|---|---|---|---|---|---|---|---|---|
| AP Model | D | E | F | G | H | J | EEE | FFF | GGG |
| Chipset | A1 | A2 | A3 | A3 | A4 | A5 | | | |
| | | | | | | | SSID | | |
| OUI | A... | A... | A... | A... | A... | A... | A... | A... | A... |
| VS Chipset | T | T | T | T | T | T | T | T | N |
| MODES | b/g/n | b/g/n | b/g/n | b/g/n | b/g/n | b/g/n | b/g/n | b/g/n | b/g/n |
| Number Spatial Streams | 2 | 3 | 2 | 2 | 2 | 2 | 2 | 2 | 2 |
| Capabilities | 0x0431 | 0x0431 | 0x0431 | 0x0431 | 0x0801 | 0x0801 | 0x0431 | 0x0421 | 0x0031 |
| Radio Measurements | 0 | 0 | 0 | 0 | 0 | 0 | 0 | 0 | 0 |
| APSD | 0 | 0 | 0 | 0 | 0 | 0 | 0 | 0 | 0 |
| Short Time Slot | 1 | 1 | 1 | 1 | 1 | 1 | 1 | 1 | 1 |
| Spectrum Management | 0 | 0 | 0 | 0 | 0 | 0 | 0 | 0 | 0 |
| Short Preamble | 1 | 1 | 1 | 1 | 1 | 1 | 1 | 1 | 1 |
| WEB Support | 0 | 0 | 0 | 0 | 0 | 0 | 0 | 0 | 0 |
| HT Capabilities | 0x01ce | 0x01ee | 0x01ef | 0x01ef | 0x116e | 0x11ef | 0x11ef | 0x11ef | 0x01ac |
| DSS/CCK mode in 40MHz | 0 | 0 | 0 | 0 | 1 | 1 | 0 | 0 | 0 |
| Max a-MSDU 7935B | 0 | 0 | 0 | 0 | 0 | 0 | 0 | 0 | 0 |
| HT Rx STBC SS | 1 | 1 | 1 | 1 | 1 | 1 | 1 | 1 | 1 |
| HT Tx STBC | 0 | 0 | 0 | 0 | 0 | 0 | 0 | 0 | 0 |
| HT Short GI for 40MHz | 1 | 1 | 1 | 1 | 0 | 1 | 1 | 1 | 1 |
| HT Short GI for 20MHz | 0 | 0 | 0 | 0 | 0 | 0 | 0 | 0 | 0 |
| HT Green Field | 0 | 0 | 0 | 0 | 0 | 0 | 0 | 0 | 0 |
| SM Power Save Disabled | 0 | 0 | 0 | 0 | 0 | 0 | 1 | 1 | 1 |
| HT Support Channel Width | 0 | 0 | 0 | 0 | 0 | 0 | 0 | 0 | 0 |
| HT LDPC Coding | 0 | 0 | 0 | 0 | 0 | 0 | 0 | 0 | 0 |
| HT Extended Capabilities | 0x0c00 | 0x0c00 | 0x0400 | 0x0400 | 0x0000 | 0x0400 | 0x0400 | 0x0000 | 0x0000 |
| Additional Capabilities info | 0x0d | 0x0d | 0x0d | 0x0d | 0x0d | 0x0d | 0x0d | 0x05 | 0x00 |
| Additional Capabilities info | 0x0008 | 0x0000 | 0x0008 | 0x0008 | 0x0000 | 0x0000 | 0x0008 | 0x0001 | 0x0011 |
| Pre-n-HT Capabilities | 0x11ce | | | | 0x116e | | 0x03 | | |
| A-MPDU | 0x1b | 0x1b | 0x03 | 0x03 | 0x03 | 0x1b | 0x03 | 0x1b | 0x1b |
| MPDU Density | 5 | 5 | | | | 5 | | 5 | 5 |
| WMM U-ASPD Enabled | 1 | 1 | | | | 1 | | | |
| WPS | 1 | | | | 0 | 1 | 0 | 0 | 0 |

| KNOWN APs | | | | | | |
|---|---|---|---|---|---|---|
| AP Model | D | E | F | G | H | J |
| Chipset | A1 | A2 | A3 | A3 | A4 | A5 |
| OUI | T | T | T | T | T | T |

| Beacon Order | SSID | SSID | SSID | SSID | SSID | SSID |
|---|---|---|---|---|---|---|
| | Supported Rates | Supported Rates | Supported Rates | Supported Rates | Supported Rates | Supported Rates |
| | DS Parameter Set | DS Parameter Set | DS Parameter Set | DS Parameter Set | DS Parameter Set | DS Parameter Set |
| | TIM | TIM | TIM | TIM | TIM | TIM |
| | ERP Information 2a | ERP Information 2a | ERP Information 2a | ERP Information 2a | Country | ERP Information 2a |
| | Extended Supported Rates | RSN | RSN | Extended Supported Rates | ERP Information 2a | Extended Supported Rates |
| | VS Microsoft WMM | Extended Supported Rates | Extended Supported Rates | HT Capabilities | Extended Supported Rates | HT Capabilities |
| | VS Epigram 802.11n D1.10 | HT Capabilities | HT Capabilities | HT Information | HT Capabilities | HT Information |
| | HT Capabilities | HT Information | HT Information | VS Microsoft WMM | HT Information | VA Atheros Type 1 |
| | VS Epigram 802.11n D1.00 | Extended Capabilities | VA Atheros Type 1 | VA Atheros Type 1 | VS Microsoft WMM | VS Microsoft WPS |
| | HT Information | VA Atheros Type 1 | VS Microsoft WPS | VS Microsoft WPS | VS Epigram 802.11n D1.10 | VS Microsoft WPA |
| | VA Atheros Type 1 | VS Microsoft WPS | | | VS Epigram 802.11n D1.00 | RSN |
| | VA Atheros Type 4 | | | | VA Atheros Type 1 | VS Microsoft WPA |
| | VS Microsoft WPS | | | | VS Microsoft WPS | |

| UNKNOWN APs | | |
|---|---|---|
| SSID | EEE | FFF | GGG |
| | T | T | N |

| Beacon Order | SSID | SSID |
|---|---|---|
| | Supported Rates | Supported Rates |
| | DS Parameter Set | DS Parameter Set |
| | TIM | TIM |
| | ERP Information 2a | ERP Information 2a |
| | Extended Supported Rates | RSN |
| | HT Capabilities | Extended Supported Rates |
| | HT Information | HT Capabilities |
| | VS Microsoft WMM | AP Channel Report |
| | VA Atheros C | HT Information |
| | VS Microsoft WPS | Neighbor Report |
| | | OBSS Scan Parameters |
| | | Extended Capabilities |
| | | VS Microsoft WMM |
| | | VA Atheros C |

FIG. 11

⊞ Frame 275: 297 bytes on wire (2376 bits), 297 bytes captured (2376 bits) on interface 0
⊞ Radio tap Header v0, Length 26
⊟ IEEE 802.11 Beacon frame, Flags: ........c
   Type/Subtype: Beacon frame (0x0008)
 ⊞ Frame Control Field: 0x8000
   .000 0000 0000 0000 = Duration: 0 microseconds
   Receiver address: Broadcast (e8:39:35:0d:3b:4e)
   Destination address:         (e8:39:35:0d:3b:4e)
   Transmitter address: AsustekC_79:2b:7c (54:a0:50:79:2b:7c)
   Source address: AsustekC_79:2b:7c (54:a0:50:79:2b:7c)
   BSS ID: AsustekC_79:2b:7c (54:a0:50:79:2b:7c)
   Fragment number: 0
   Sequence number: 536
 ⊞ Frame check sequence: 0xf404dca7 [correct]
⊟ IEEE 802.11 wireless LAN management frame
 ⊟ Fixed parameters (12 bytes)
    Timestamp: 0x0000004d704f9b55
    Beacon Interval: 0.102400 [seconds]
  ⊞ Capabilities Information: 0x0c01
 ⊟ Tagged Parameters
  ⊞ Tag: SSID parameter set: "MMMM"
  ⊞ Tag: Supported Rates 1(B), 2(B), 5.5(B), 11(B), 9, 18, 36, 54, [Mbit/sec]
  ⊞ Tag: DS parameter set: Current Channel: 3
  ⊞ Tag: Extended Supported Rates 6, 12, 24, 48, [Mbit/sec]
  ⊞ Tag: ERP Information
  ⊞ Extended Support Rates 6, 12, 24, 48, [Mbit/sec]
  ⊞ Tag: HT Capabilities (802.11n D1.10)
  ⊞ Tag: HT Information (802.11n D1.10)
  ⊞ Tag: Vendor Specific: Microsoft: WMM/WME: Parameter Element
  ⊞ Tag: QBSS Load Element 802.11e CCA Version
  ⊞ Tag: Overlapping BSS Scan Parameters : Undecoded
  ⊞ Tag: Extended Capabilities (1 octet)
  ⊞ Tag: Vendor Specific: "R..."
  ⊞ Tag: Country Information: Country Code US, Environment any
  ⊞ Tag: Vendor Specific: Microsof: WPS

*FIG. 12*

IDENTIFICATION OF ACCESS POINTS IN WLAN COMMUNICATION

CROSS-REFERENCE TO RELATED APPLICATION

This application is related to and claims priority to U.S. Provisional Patent Application Ser. No. 62/301,919, filed Mar. 1, 2016, entitled "IDENTIFICATION OF ACCESS POINTS IN WLAN COMMUNICATIONS," the entirety of which is incorporated herein by reference.

STATEMENT REGARDING FEDERALLY SPONSORED RESEARCH OR DEVELOPMENT

This disclosure was made with government support under contract MSA-PAT-2015003 awarded by the United States Department of Defense. The government has certain rights in the disclosure.

FIELD

Wireless local area network (WLAN) device communications and, in particular, to a method and system configured to identify unknown access points.

BACKGROUND

Initially, it is noted that IEEE Standard 802.11-2012 (Standard) is used as a reference for specifications used in this disclosure, the entire contents of which are incorporated herein by reference.

FIG. 1 is a block schematic diagram of a typical IEEE 802.11 infrastructure network 100. A number of mobile nodes, or mobile stations (STA) 120a, 120b, 120c, 120d, 120e and 120f (collectively referred to herein as "mobile nodes 120") may or may not be associated with an access point (AP) 110. AP 110 is in communication with a hardwired distribution system (DS) 130. In such a network, the AP 110 will periodically transmit beacons in order to allow the unassociated mobile nodes 120 to locate and identify the network, and will allow the AP 110 to convey information to the associated mobile nodes 120. In addition, the AP 110 transmits probe responses in reply to probe requests received from unassociated STAs. The information contained within the beacon and probe response management frames are very similar and to a large extent identical. The following background description describing the methods and arrangements of this disclosure will use the beacon as the source for the fingerprinting of AP 110. It is clear to persons skilled in the art that the following background description may also be applied to the probe responses transmitted by the AP 110.

The Standard specifies the information that may be included in the frame body of a Beacon management frame. It should be noted that the IEEE Standard 802.11 ("Standard") is regularly revised as new amendments are approved. As a result of approved amendments and revisions of the Standard, additional information may be added to the Beacon frame body. It should also be noted that the beacon transmitted by AP 110 may include some or all of the information allowed by the Standard. The determination of what information to include in the beacon frame body is determined by each AP 110 as default settings and then possibly added to or changed by user settings. The information provided in the beacon will, to some extent, reflect the capabilities of the AP 110 as well as specific user settings.

There is no requirement that the information included in the beacon be in a particular order. However, it is common practice that the beacon starts with "Fixed Parameters," which include, for example, Information, i.e., Timestamp, Beacon Interval, and Capability, followed by "Tagged Parameters," which are Information Elements (IEs).

One type of tagged parameter that may be included in the beacon information is the "Vendor Specific" IEs. The element format for vendor specific IEs includes an "Organization Identifier" which is the Organizationally Unique Identifier (OUI). The OUI is a 24-bit number that uniquely identifies, for example, a vendor, a manufacturer or other organizations. There are some common vendor specific IEs such as the ones for Wi-Fi Multimedia (WMM) and Wi-Fi Protected Setup (WPS) which are, respectively, the Wi-Fi Alliance IEs for quality of service settings and protected setup. In one embodiment, the present disclosure relates to vendor specific IEs that refer to the chipset and/or firmware vendor.

FIG. 2 shows the management frame format for a typical beacon transmission. When an AP 110 transmits the beacon, the beacon is sent with a particular format. For example, "Address 2" represents the Media Access Control (MAC) address of AP 110. Typically, the first three octets of the MAC address are the OUI. Hence, the OUI of the MAC address typically identifies the identity of the vendor.

FIG. 3 is an example of information obtained in a beacon capture from a known AP 110 using an analyzer tool such as, for example, the WIRESHARK® analyzer tool. The information obtained from the captured beacon may include the following:

Transmitter Address. The first three octets of the address are the OUI.

Capabilities Information: The details of this is the value 0x0c01 (which, in this example, is in hex format).

Supported Rates: Provides the list of supported data rates. Those rates followed by "(B)" are "Base" rates.

Extended Supported Rates: Provides additional list of supported data rates.

Country Information: The presence of this IE is distinctive.

AP Channel Reports: The presence of these IEs is distinctive and indicates that this AP 110 has network management features.

Vendor Specific MICROSOFT® WPS: This indicates that this AP 110 supports "EZ Configuration," a Wi-Fi Alliance specified feature.

High throughput (HT) Capabilities and HT Information: These tags indicate that the AP 110 supports 802.11n capability.

Overlapping Basic Service Set (BSS) Scan Parameters: The presence of these IEs is distinctive and indicates that this AP 110 has network management features.

Extended Capabilities: This tag indicates extended capabilities.

Vendor Specific MICROSOFT® Wi-Fi Multimedia/Wireless Multimedia Extensions (WMM/WME): This tag indicates that the AP 110 supports the "Wi-Fi Multi Media" features. This is a Wi-Fi Alliance specified feature based upon the Enhanced Distributed Channel Access (EDCA) feature in the 802.11 Standard.

Quality of Service (QoS) Basic Service Set (QBSS) Load Element: The presence of these IEs is distinctive and indicates that this AP 110 has network management features.

Vendor Specific: This indicates the identity of the AP 110 chipset vendor.

Thus, the information provided in the beacon received from a known AP 110 can be used to create a record of information or "fingerprint" for this particular AP 110. Furthermore, from FIG. 3, the order that the tagged parameters are sent is seen as received signal strength indication (RSSI), Supported Rates, distribution system (DS) Parameter Set, Extended Supported Rates, Country Information, AP Channel Report, AP Channel Report, traffic indication map (TIM), Vendor Specific Microsoft Wi-Fi protective setup (WPS), extended rate physical layer (ERP), HT Capabilities, HT Information, Overlapping BSS Scan Parameters, Extended Capabilities, Vendor Specific Microsoft WMM/WME, Quality of service BSS (QBSS) Load Element, Vendor Specific "R . . . ". The order in which the information in a beacon is transmitted may differ significantly between APs 110. Hence, the order of the received information can also be used as part of the fingerprint for this particular AP 110.

FIG. 4 is also a list of parameters for the AP beacon of FIG. 3, but in this example, the HT Capabilities and HT Information details have been expanded. From the Supported Rates field, and Extended Supported Rates field, the AP 110 indicates that it supports 802.11b and 802.11g modes. In addition, the AP 110 indicates that it also supports 802.11n mode by including the HT Capabilities and HT Information elements in its beacon. In this example, some details within these elements, include:

HT Capabilities Info: a value of 0x0c00

Aggregate-MAC Protocol Data Unit (A-MPDU) Parameters: a value of 0x17

Receiver Modulation Coding Scheme (RX MCS) Set: an examination of the bitmasks indicates that the AP 110 supports the reception of MCS 0 to 15 and MCS 32. Hence, the AP 110 supports two spatial streams. In addition, the transmission (TX) and receiving (RX) MCS Set bit is 0 indicating that this AP 110 also supports two spatial streams on transmit. The Multiple Input and Multiple Output (MIMO) capability of an 802.11n device is termed (a)×(b):(c), where (a) is the maximum number of transmit antennas or TX chains, (b) is the maximum number of receive antennas or RX chains, and (c) is the maximum number of data spatial streams. Hence, by examining the HT Capabilities element, this AP 110 has a MIMO capability of 2×2:2.

HT Information: the three HT Information Subset values are 0x05, 0x000, 0x0000 respectively.

The specific details and breakdown of each of the elements shown in FIGS. 3 and 4 and explanations of each of the values and their corresponding features are not necessary for understanding the present disclosure. For the purposes of this disclosure, the presence of the IE, the corresponding values, and the order in which they are sent are considered. There may be instances, however, when further inspection of the particular features can be useful. Examples of these instances are explained below.

SUMMARY

According to one aspect of the disclosure, a method in a node identification system for identifying at least one unknown access point in a communications network using details related to at least one known access point and organization of the details related to the at least one known access point is provided. The method includes capturing details related to the at least one unknown access point and identifying an organization of the captured details related to the at least one unknown access point, comparing the details related to the at least one known access point and the organization of the details related to the at least one known access point with the captured details related to the at least one unknown access point and the organization of the captured details related to the at least one unknown access point, and determining a type of the at least one unknown access point based on the comparing of the details related to the at least one known access point and the organization of the captured details related to the at least one known access point with the captured details related to the at least one unknown access point and the organization of the captured details related to the at least one unknown access point.

According to an embodiment of this aspect, at least one of the details related to the at least one known access point and the details related to the at least one unknown access point is captured by a network protocol analyzer. According to another embodiment, the method further includes obtaining known data about the at least one known access point, and creating a fingerprint database, the fingerprint database comprising the organized details related to the at least one known access point and the obtained known data about the at least one known access point.

According to another embodiment, comparing the details related to the at least one known access point and the organization of the captured details related to the at least one known access point with the captured details related to the at least one unknown access point and the organization of the captured details related to the at least one unknown access point includes comparing the details related to the at least one unknown access point and the organization of the captured details related to the at least one known access point with the organized details related to the at least one known access point and the obtained known data about the at least one known access point.

According to another embodiment, the details related to the at least one known access point includes at least one of an identity of a vendor of the at least one known access point, a model number of the at least one known access point, a chipset type of the at least one known access point, and a firmware version used in the at least one known access point. According to another embodiment, if the details related to the at least one known access point and the organization of the captured details related to the at least one known access point does not match the captured details related to the at least one unknown access point and the organization of the captured details related to the at least one unknown access point, the method further includes outputting a list of known access points having details closest to details of the at least one unknown access points. According to another embodiment, the method further includes storing the details related to the at least one unknown access point and the organization of the captured details related to the at least one unknown access point in an unknown access point database, comparing contents of the unknown access point database with future captured details related to other known access points, identifying those details related to the at least one unknown access point that match the future captured details related to the other known access points based on comparing the contents of the unknown access point database with the future captured details related to other known access points and the organization of the future captured details related to the other known access points, and updating the contents of the unknown access point database to include the identified details.

According to another embodiment, the details related to the at least one known access point are captured from a beacon transmitted by the at least one known access point and the details related to the at least one unknown access point are captured from another beacon transmitted by the at least one unknown access point. According to another embodiment, the details related to the at least one known access point are captured from another probe response transmitted by the at least one known access point in response to a probe request and the details related to the at least one unknown access point are captured from a probe response transmitted by the at least one unknown access point in response to a probe request. According to another embodiment, if a match is found between the details related to the at least one known access point and the organization of the captured details related to the at least one known access point, and the captured details related to the at least one unknown access point and the organization of the captured details related to the at least one unknown access point, the method further includes outputting information regarding the match to at least one of a display and a file.

According to another aspect of the disclosure, a node identification system configured to identify at least one unknown access point in a communications network using details related to at least one known access point and organization of the captured details includes a communications interface configured to capture details related to the at least one unknown access point and identifying an organization of the captured details related to the at least one unknown access point, and processing circuitry including a memory and a processor, the memory in communication with the processor, the memory having instructions that, when executed by the processor, configure the processor to compare the details related to the at least one known access point and the organization of the captured details related to the at least one known access point with the captured details related to the at least one unknown access point and the organization of the captured details related to the at least one unknown access point, and determine a type of the at least one unknown access point based on the comparing of the details related to the at least one known access point and the organization of the captured details related to the at least one known access point with the captured details related to the at least one unknown access point and the organization of the captured details related to the at least one unknown access point.

According to an embodiment of this aspect, at least one of the details related to the at least one known access point and the details related to the at least one unknown access point is captured by a network protocol analyzer. According to another embodiment, the processor is further configured to obtain known data about the at least one known access point, and create a fingerprint database, the fingerprint database comprising the organized details related to the at least one known access point and the obtained known data about the at least one known access point.

According to another embodiment, wherein comparing the details related to the at least one known access point and the organization of the captured details related to the at least one known access point with the captured details related to the at least one unknown access point and the organization of the captured details related to the at least one unknown access point includes comparing the details related to the at least one unknown access point and the organization of the captured details related to the at least one known access point with the organized details related to the at least one known access point and the obtained known data about the at least one known access point stored in the fingerprint database. According to another embodiment, the details related to the at least one known access point includes at least one of an identity of a vendor of the at least one known access point, a model number of the at least one known access point, a chipset type of the at least one known access point, and a firmware version used in the at least one known access point.

According to another embodiment, if the details related to the at least one known access point and the organization of the captured details related to the at least one known access point does not match the captured details related to the at least one unknown access point and the organization of the captured details related to the at least one unknown access point, further comprising outputting a list of known access points having details closest to details of the at least one unknown access points. According to another embodiment, the processor is further configured to store the details related to the at least one unknown access point and the organization of the details related to the at least one unknown access point in an unknown access point database, compare contents of the unknown access point database with future captured details related to other known access points and organization of the future captured details related to the other known access points, identify those details related to the at least one unknown access point that match the future captured details related to the other known access points based on comparing the contents of the unknown access point database with the future captured details related to other known access points and the organization of the future captured details related to the other known access points, and update the contents of the unknown access point database to include the identified details.

According to another embodiment, the details related to the at least one known access point are captured from a beacon transmitted by the at least one known access point and the details related to the at least one unknown access point are captured from another beacon transmitted by the at least one unknown access point. According to another embodiment, the details related to the at least one known access point are captured from a probe response transmitted by the at least one known access point in response to a probe request and the details related to the at least one unknown access point are captured from another probe response transmitted by the at least one unknown access point in response to a probe request.

According to another aspect of the disclosure, a method in a node identification system for identifying at least one unknown access point in a communications network using details related to at least one known access point and organization of the details related to the at least one known access point, the details related to the at least one known access point including at least one of an identity of a vendor of the at least one known access point, a model number of the at least one known access point, a chipset type of the at least one known access point, and a firmware version used in the at least one known access point, is provided. The method includes receiving a beacon from at least one unknown access point, capturing details from the received beacon related to the at least one unknown access point and identifying an organization of the captured details related to the at least one unknown access point, comparing the details related to the at least one known access point and the organization of the details related to the at least one known access point with the captured details related to the at least one unknown access point and the organization of the captured details related to the at least one unknown access point, and determining a type of the at least one unknown access point based on the comparing of the details related to the at least one known access point and the organization of the details related to the at least one known access point with the captured details related to the at least one unknown access point and the organization of the captured details related to the at least one unknown access point.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 3 is an example of data from a beacon capture, from a known AP;

FIG. 4 is the same beacon as in FIG. 3 but the HT Capabilities and HT Information details have been expanded;

FIG. 8 is a table of beacon details extracted from known APs and also unknown APs that all use an identifiable chipset;

FIG. 9 is a table of the content and transmission order of the information in the beacons of the same known and unknown APs as in FIG. 8;

FIG. 10 is a table of beacon details extracted from known APs and also unknown APs that all use another identifiable chipset;

FIG. 11 is a table of the content and transmission order of the information in the beacons of the same known and unknown APs as in FIG. 10;

FIG. 12 is an example of a probe response capture, transmitted by the same AP used in FIG. 3;

DETAILED DESCRIPTION

Figure 1:
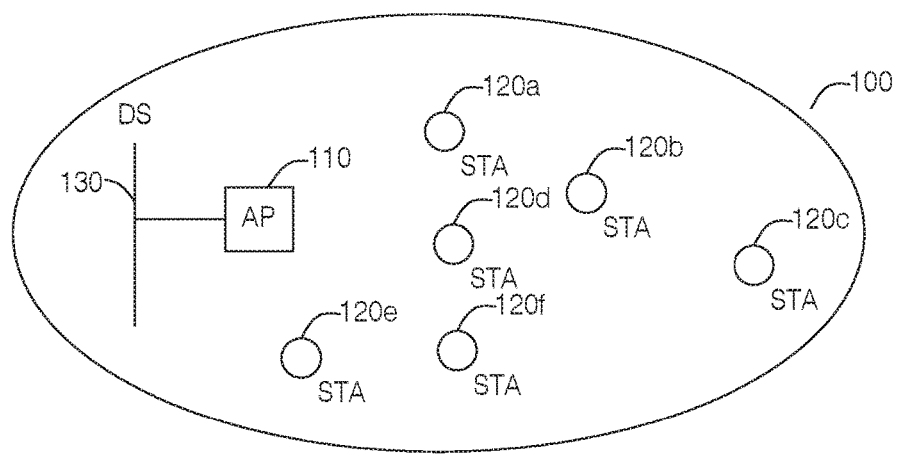
FIG. 1 is an exemplary schematic diagram of a typical IEEE 802.11 infrastructure network comprising an AP and STAs that may or may not be associated to the AP.
Figure 2:
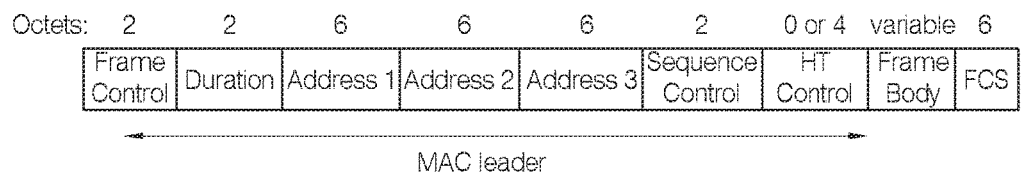
FIG. 2 is an exemplary IEEE 802.11 Management frame format.

This disclosure relates to the identification of Access Points (APs) 110 that are based upon the IEEE 802.11 technology, commonly known as Wi-Fi. This disclosure also relates to the identification of, for example, an unknown Access Point vendor, the Access Point model, the chipset vendor and the chipset type, and also, in some cases, of the specific firmware version that is in use on that chipset/AP. This disclosure also relates to the details of beacon and probe response transmissions.

This disclosure further relates to the "fingerprinting" of APs 110 by inspection, recording, classification and/or comparison of their beacon and/or probe response transmissions. By the inspection of a beacon and/or the probe response transmission plus the consideration of the order or organization that the information is transmitted in, a unique "fingerprint" for that AP 110 can be determined. The details and order or organization of the beacon element details, together with the OUI of the MAC address can be unique and vary significantly between different APs 110. Thus, by collecting and storing the beacon information together with the specific details of known APs 110, such as, e.g., vendor, model, chipset vendor, chipset type, firmware, etc., a database of "fingerprints" for various APs 110, can be created. By comparison of fingerprints from unknown APs 110 with known APs 110, information such as type/model/chipset/version of the unknown AP 110 can be determined.

In one embodiment, when beacons from an unknown AP 110 are detected and decoded, certain information can be readily extracted. For example, this information may include the identity of the AP Vendor, obtained from the OUI of the transmitter address; Modes, a/b/g/n/ac—obtained from the supported data rates, HT and Very High Throughput (VHT) Capabilities elements; MIMO Spatial Streams Capability—obtained from the supported MCS fields; and/or Chipset vendor—obtained from the vendor specific element. The preceding information is exemplary only and other AP identification information can be detected, decoded and extracted. Thus, a database containing the attributes of known APs 110 can be created. Then, when a beacon from an unknown AP 110 is received, the information contained in the beacon can be compared with the database of the attributes of the known APs 110.

By selecting and comparing data extracted from the beacon of the unknown AP 110 to a similar chipset or AP vendor information obtained from the beacon received from the known AP 110, it is possible to further identify the model and the chipset type of the unknown AP 110. If a match is not found, then the "fingerprint" of the unknown AP 110 could be saved so that at a later time, a new known AP 110 may be found that has the same fingerprint. In many cases, even if an exact match is not found, it is still possible to narrow down the chipset type and/or AP model of the unknown AP 110 to a particular family by comparing the fingerprint of the unknown AP 110 with the fingerprints of known APs 110 and known chipsets in order to obtain a closest match.

Wi-Fi IEEE 802.11 transmissions can be readily captured using a network protocol analyzer tool, such as the "WIRE-SHARK®" packet analyzer used for network troubleshooting and analysis, although any similar tool may be used. Such a tool can be used, together with an 802.11 receiver, to capture and view the management, control and data frames from the wireless traffic. In particular, the beacon and probe response transmissions can be captured and the details displayed and stored. This process is often referred to as "sniffing."

The methods and arrangements provided by this disclosure will be described using the beacon as the source for the fingerprint. However, it is clear to persons skilled in the art that the fingerprints may also be obtained when the probe responses are used.

Figure 5:
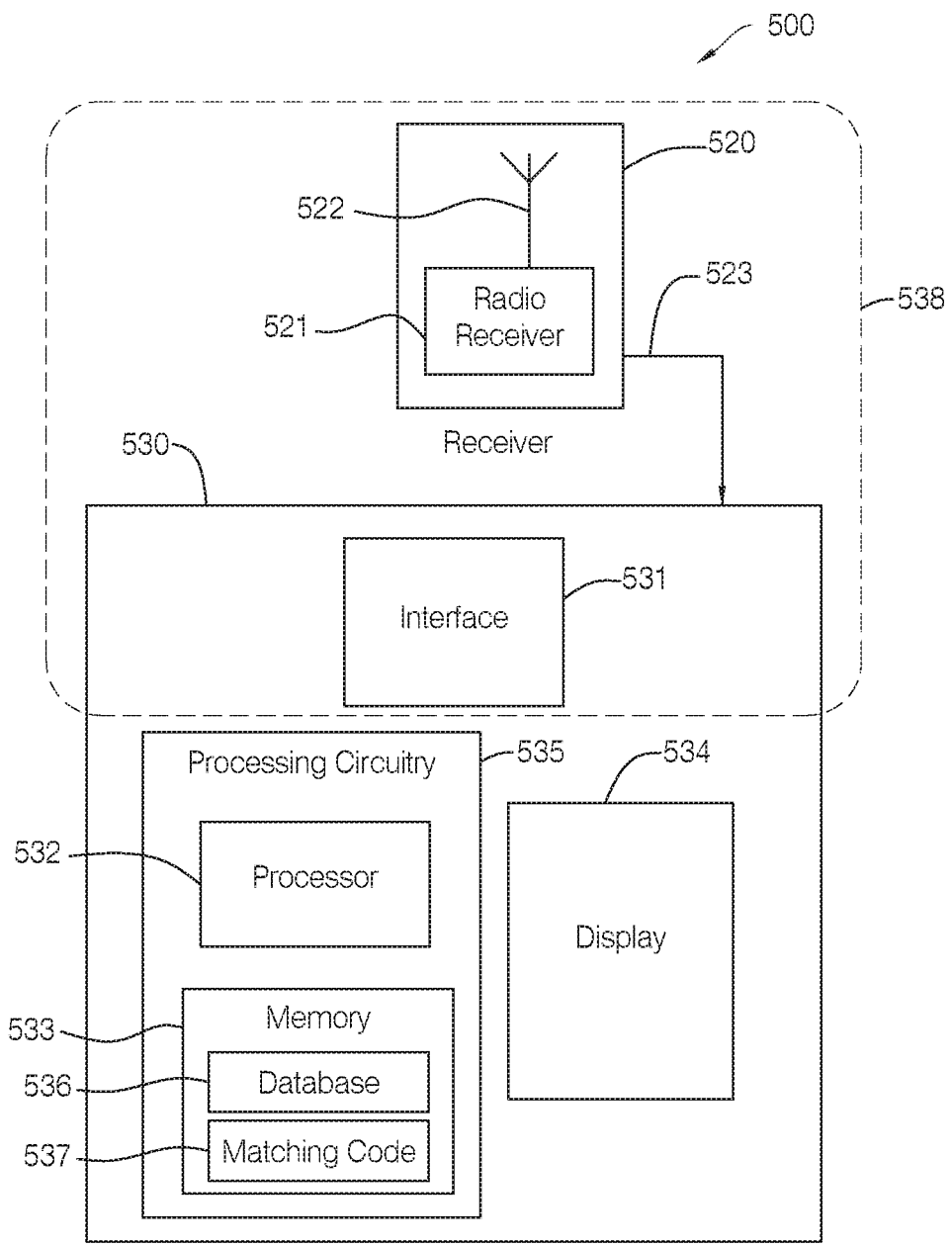
FIG. 5 is an example system constructed in accordance with the principles of the present disclosure.

FIG. 5 is an example of a node identification system 500 constructed in accordance with the principles of the present disclosure. Node identification system 500 may be, for example a stationary node, or a mobile or portable node. As shown in the block diagram of FIG. 5, node identification system 500 includes a wireless receiver 520. The receiver 520 has an antenna 522 and a radio receiver 521. Although not shown, it is understood that the receiver 520 also includes a processor and memory to carry out the functions described herein with respect to the receiver 520.

The signals radiated from APs 110 are picked up at antenna 522 and applied to the radio receiver 521 where they are detected and may be demodulated. In particular, receiver 520 receives and demodulates the beacon transmissions of APs 110. The demodulated signals are outputted from the radio receiver 521 and received by the computer system 530 via connection 523. Connection 523 may be, for example, an Ethernet, a Universal Serial Bus (USB), or serial connection. The computer system 530 has an interface 531 for receiving signals from wireless receiver 520, processing circuitry 535, which includes a processor 532, a memory 533, and a display 534. Memory also stores matching code 537, which, along with processor 532, and as explained in further detail below, determines if the information related to the known access points matches the information related to the unknown access points. Receiver 520 and interface 531 of computer system 530 are referred to collectively as "communications interface 538."

In one embodiment, memory 533 stores programmatic instructions that when executed by processor 532, cause computer system 530 to perform the functions described herein. In addition to a traditional processor and memory, processing circuitry 535 may include integrated circuitry for processing and/or control, e.g., one or more processors and/or processor cores and/or FPGAs (Field Programmable Gate Array) and/or ASICs (Application Specific Integrated Circuitry). Processing circuitry 535 may include and/or be connected to and/or be configured for accessing (e.g., writing to and/or reading from) memory 533, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 533 may be configured to store code executable by control circuitry and/or other data, e.g., data pertaining to communication, e.g., configuration and/or address data of nodes, etc. Memory 533 includes database 536. As explained in further detail below, database 536, as managed by processor 532, is configured to store the beacon data that has been previously obtained from known APs 110 as well as unknown APs 110 as described herein to create a set of AP "fingerprints." The receiver system 520 and the computer system 530 may be separate devices or may be incorporated into one physical device.

In one embodiment, radio receiver 521 is used as a network protocol analyzer to detect, receive and demodulate Wi-Fi transmissions as described in further detail below. The demodulated signals are passed to the computer system 530 where the beacon signals are selected.

Figure 6:
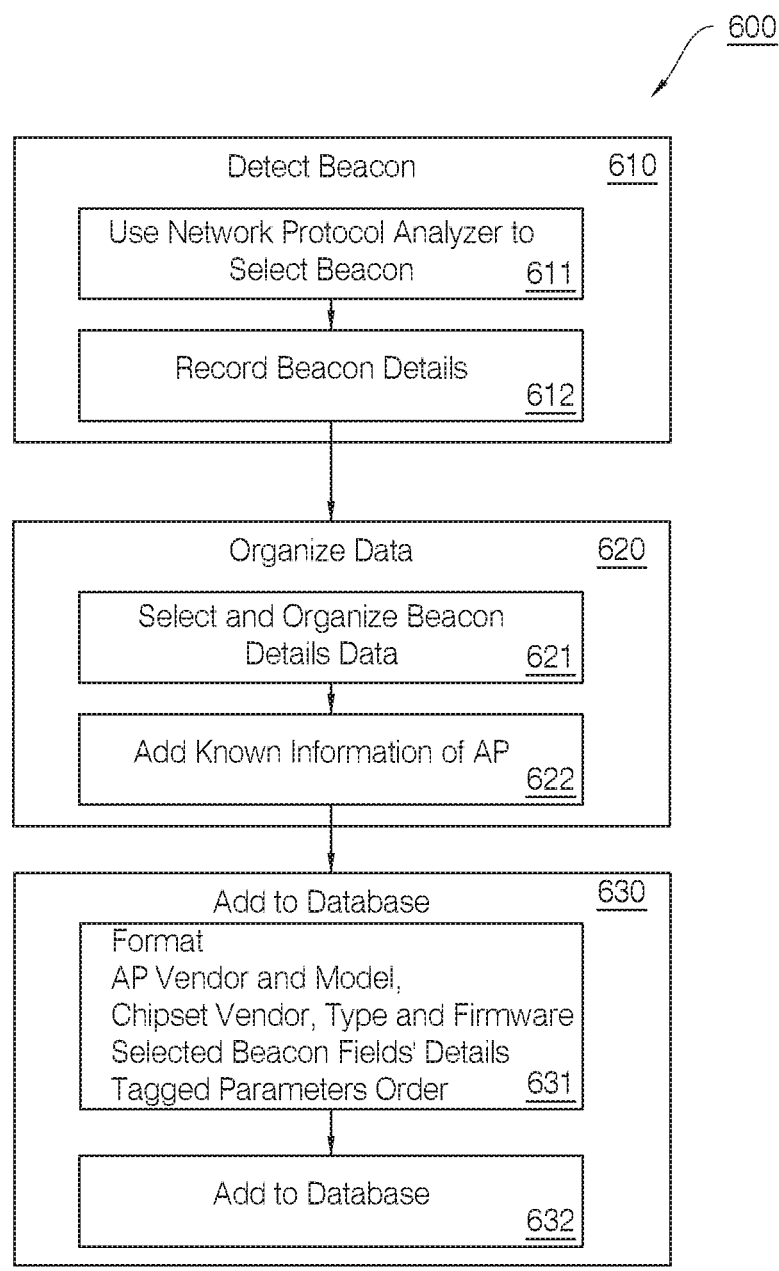
FIG. 6 illustrates a method according to an exemplary embodiment of the disclosure related to capturing a beacon from a known AP.

FIG. 6 illustrates method 600 according to an exemplary embodiment of the disclosure where the AP 110 is known. Method 600 may start with stage 610 with the detection of the beacon of a known AP 110, i.e., an AP 110 which is in the possession of the person or persons creating database 536. The detection of the beacon may be performed by receiver 520. In one embodiment, stage 610 may include stage 611 where the beacon transmission(s) of the AP 110 under test is selected using a network protocol analyzer. This analyzer may be a readily available analyzer such as the open-source WIRESHARK® analyzer, or a proprietary analyzer. Such "sniffers" are well known in the field of WLANs. Stage 611 may be followed by stage 612 where the decoded beacon transmission is recorded. The method of recording or saving the received information details may vary. In one embodiment, the information is saved in the WIRESHARK® analyzer "pcap" file possibly after filtering, or the detected details are parsed and saved to a file. Stage 610 may be followed by stage 620 where the recorded or stored data from the beacon transmission is organized into a desired form. Stage 620 may include stage 621 where a selected portion of the stored beacon data is selected and placed in a particular order or organization. In other words, "organized" and organized details refers to the arrangement, e.g., order, of the details itself. Some details of the beacon transmission tend to be default and fixed, related to the AP 110 and its features, and other parts may be configurable by the AP user. The default fixed parameters are of particular use for the process of gathering a fingerprint. However, it is still worthwhile selecting and storing some of the other information. APs 110 can be configured by a user either over the air or by direct connection. The parameters that can be configured by the user though vary considerably. An enterprise grade AP 110, for example, usually provides many configurable features whereas an AP 110 for the domestic market provides a much more limited selection. Hence, the selection of the parameters or details in stage 621 may differ according to the exposure of the features for configuration by the user.

Stage 621 may be followed by stage 622 where the known information of the AP 110 is added to the details gathered in stage 621. Stages 620, 621, and 622 may be performed by processing circuitry 535. Method 600 is concerned with forming a database 536 of APs 110 and hence the APs 110 used in this method are in the possession of the person or persons constructing the database 536. Details of the AP 110 such as vendor, model number, and chipset type and firmware version can be gathered in several ways. For example, the vendor and model number may be printed on a label attached to the AP 110. The chipset may be determined in several ways, including but not restricted to, visual inspection, using Internet sites such as www.wikidevi.com, which contains details of many APs 110, and/or connecting to the AP 110, via either a wired or wireless connection, and reading the information provided in the web based management utility of the AP 110. The web based management utility will usually also provide the firmware version and/or the ability to load new firmware in to the AP 110 and know which firmware is present.

Stage 620 may be followed by stage 630 where the gathered and organized data is added to database 536. Stage 630 may include stage 631 where the known AP data from stage 622, together with the selected AP beacon data from stage 621 are organized into a format compatible with database 536. Also, the order that the tagged parameters are transmitted is also included. Stage 631 may be followed by stage 632 where the aforementioned data, formatted in stage 631, is entered in database 536. Stages 630, 631 and 632 may be performed by processing circuitry 535.

Method 600 may be repeated for every AP 110 of interest and in the possession of the person or persons constructing database 536 and may be repeated at regular intervals as new APs 110 are discovered. In such manner, a database 536 of AP fingerprints is created, maintained, and updated.

Figure 7:
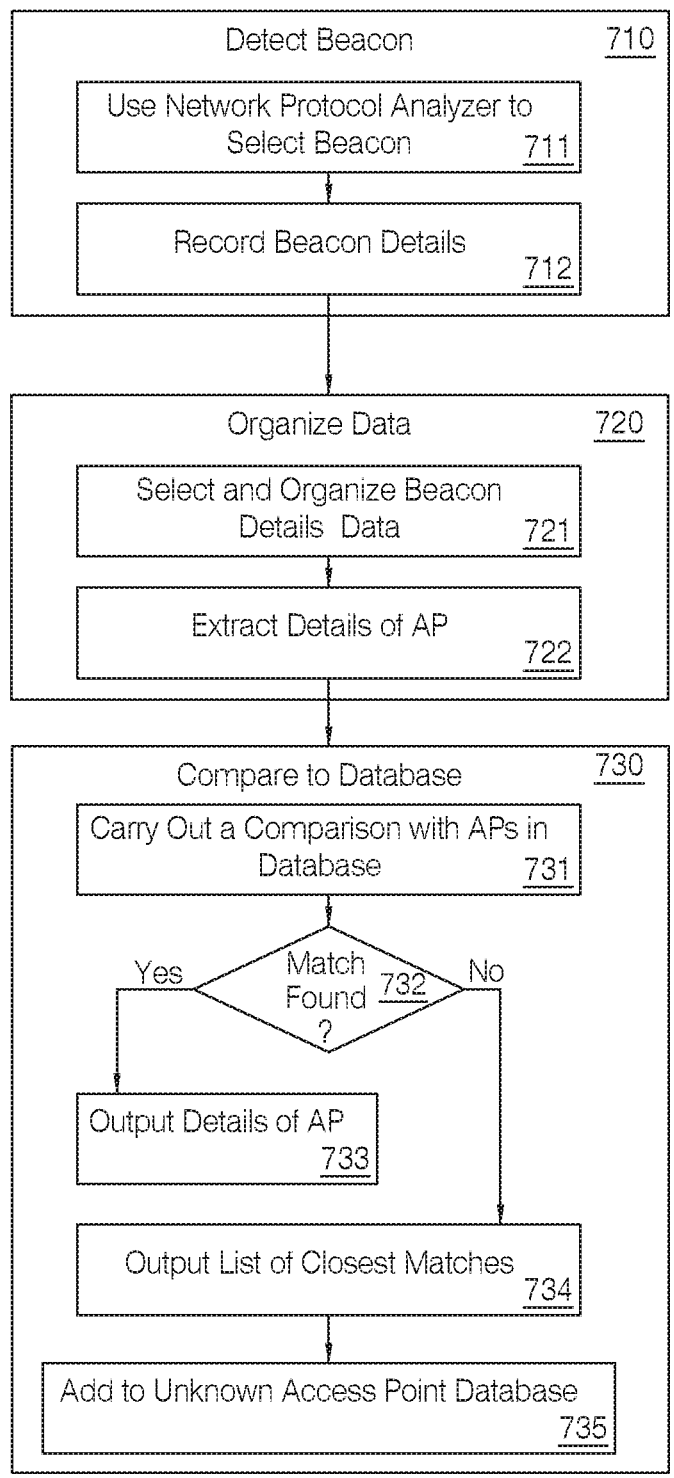
FIG. 7 illustrates a method according to an exemplary embodiment of the disclosure related to capturing a beacon from an unknown AP.

FIG. 7 illustrates method 700 according to an exemplary embodiment of the disclosure where the AP 110 is not known. An unknown AP 110 is one that is not in the immediate possession of the person or persons conducting the search. Method 700 may include stage 710 with the detection of the beacon of an unknown AP 110. The detection of the beacon may be performed by receiver 520. Stage 710 has a similar function to stage 610 of FIG. 6. Stage 710 may include stage 711 where the beacon transmission(s) of the AP 110 is selected using a network protocol analyzer. Stage 711 has a similar function to stage 611 of FIG. 6. The detection of the beacon may be performed by receiver 520. Stage 710 may include stage 712 where the decoded beacon transmission is recorded. Stage 710 may be followed by stage 720 where the recorded or stored data from the beacon transmission is organized into a desired form. Stage 720 may start by stage 721 where a selection of the stored beacon data is selected and placed in a particular order. Stage 721 has a similar function to stage 621 of FIG. 6. Stage 721 may be followed by stage 722 where particular details of the AP 110 are extracted from the data. This may include the AP Vendor and/or the chipset vendor. In addition, the Service Set Identifier (SSID) may be extracted. The AP vendor, chipset vendor and SSID may be used to act as a reference to this particular, unknown AP 110. Stages 720, 721 and 722 may be performed by processing circuitry 535.

Stage 720 may be followed by stage 730 where the recorded data from stage 712 is compared to the AP information stored in database 536 that was created using method 600. Stage 730 may include stage 731 where the details of the captured beacon data that has been organized in stage 720 is compared to the database of beacons of known APs 110 and chipsets that has been organized and prepared in method 600 and stage 632. Stage 731 may be followed by stage 732 where a check is made as to whether a match has been found. If an exact match has been found, then stage 731 may be followed by stage 733 where information regarding the match is outputted. The output may take the form of a display or an entry into a file. If an exact match is not found in stage 732, then stage 732 may be followed by stage 734 where a list of the closest matches is outputted. This output may be in a particular order. For example, it may be that there is just one minor difference in the comparisons which may be in a field that could be configured by a user. In such a case, the output may indicate a strong likelihood of a match.

Furthermore, in such a case, there is a chance that the chipset type may be identified. It should be clear to one of skill in the art that there are many combinations of matches that could be used to create a degree of likelihood of a match. This disclosure is based upon the recognition that beacon details are unique and can be used to fingerprint a particular AP model and chipset. Stage 734 may be followed by stage 735 where the details of the unknown AP 110 are entered into an unknown access point database. This maybe a separate database or a subset of the same database 536 as created in method 600. The intention may be to create a database of unknown APs 110 that have been detected and recorded so as to determine if an exact match is found later, either by the use of a known AP 110 or an unknown AP 110.

FIG. 8 is a table of beacon details extracted from known APs 110 and also unknown APs 110 that use a chipset as determined from presence of the vendor specific "R . . . " element in their beacons. FIG. 8 illustrates in a pictorial manner how the database comparisons as described in stage 730 may take place. Consider first the three known APs 110, the beacon details for which are shown on the left in FIG. 8. The AP Models and chipset types are known for these three APs 110 and are shown at the top of each respective column. For each of these APs 110, selected details from their respective beacons is listed. For this disclosure, it is not important to understand what each of the fields actually means and their respective functions. Rather, it is sufficient to note that the fields are present along with their respective values. These particular fields have been preselected for the purposes of explaining this disclosure example and should not be construed as a fixed set of parameters. Of note, by observation of these details of the three known APs 110, it can be seen that no two columns are the same.

Next consider the four unknown APs 110, the beacon details for which are shown on the right of FIG. 8. The beacons of these APs 110 were captured over the air. Note now the details of the columns for the three APs 110 with SSIDs "AAA", "BBB" and "CCC." It should be readily observed that the details in their respective columns are identical and also that they are the same as the known AP model "C." In other words, their fingerprints match the known AP 110 model number C. In fact, these APs 110 were tracked down and were indeed confirmed to be model "C" devices. Now consider the fourth unknown AP 110 with a SSID value of "DDD." It is known that the AP vendor OUI is "DL" and that it has a vendor specific "R . . . ". The details in its respective column, however, do not match any of the known APs 110. As described in stage 735, the details could be entered into a database, using the SSID as identifier, in case the model and chipset is known in the future. In fact, this AP 110 was tracked down, and hence this particular AP 110 could now be entered as a known AP 110 and its fingerprint entered into the database.

FIG. 9 is a table of the content and transmission order of the information in the beacons of the same known and unknown APs 110 as in FIG. 8. Note, as before in FIG. 8, the details of the columns for the three APs 110 with SSIDs "AAA," "BBB" and "CCC." It should be readily observed that the content and order of the information in their respective columns are identical and also that they are the same, again, as the known AP "C." Also note that the content and order of the information in the respective column of the fourth unknown AP 110 with SSID "DDD" is different from all other APs 110. FIG. 9 demonstrates that the content and order of the information in the beacon also displays uniqueness across APs 110 and hence could also be used as a fingerprint for APs 110. However, it should also be noted, even from this small sample, that together, the details, as shown in FIG. 8 and the content and the order of the information in a beacon, as shown in FIG. 9, can provide a unique fingerprint for an AP 110.

FIG. 10 is similar to FIG. 8 but in this case the table is for APs 110 that have a vendor specific IE of "A . . . ". For the six known APs 110 it can be seen that their respective columns of beacon information details differ from each other. It is interesting to note that the AP models "F" and "G" use the same chipset and are very similar with the exception that AP model "F" supports the Unscheduled-Automatic Power Saver Delivery (U-APSD) feature whereas the AP model "G" does not. Inspecting the respective column for the AP with SSID "EEE", it should be observed that it is identical to the column for the AP model "G". AP with SSID "EEE" was tracked down and indeed was determined to be an AP model "G". Inspecting the column for the AP 110 with SSID "FFF" it can be seen that it does not match any column of the 6 known APs 110. As described in stage 735, the details could be entered into a database, using the SSID as an identifier, in case the model and chipset is known in the future. In fact, this AP 110 was tracked down and its details determined. Hence, this could now be entered as a known AP 110 and its fingerprint entered into the database. Inspecting the respective column for unknown AP 110 with SSID "GGG," the details do not agree with any of the known APs 101. Hence, as described in stage 735, the details could be entered into a database, using the SSID as an identifier, in case the model and chipset are known in the future. It was not possible to inspect this AP 110.

FIG. 11 is a table of the content and transmission order of the information in the beacons of the same known and unknown APs 110 as in FIG. 10. In this case, it is noted that the content and order of the information in the beacons for the AP models "F" and "G" and, which use the same chipset, "A3," are identical. The beacon content and order for the unknown AP 110 with SSID "EEE" is also identical to the beacon content and order for the AP models "F" and "G." The beacon content and order for the unknown AP 110 with SSID "GGG" does not match any other AP 110.

Again, as previously observed, it should also be noted that, together the details as shown in FIG. 8 and FIG. 10 display a unique AP 110 and/or chipset fingerprint as does the content and the order of the information in a beacon, as shown in FIG. 9 and FIG. 11. Also, together, the details, content and order, provide a unique fingerprint for an AP 110 and/or chipset. The unique fingerprint that is created using the beacon transmission can also indicate differences between firmware versions of the same AP Models and chipsets. When possible, as well as recording the AP model and chipset type, the hardware and firmware versions should also be recorded as part of the known fingerprint. APs 110 also transmit Probe Responses when they receive a Probe Request from a STA. The detailed information within the Probe Response is very similar to the information provided in the Beacon and can also be used as a fingerprint for the AP 11. FIG. 12 is an example of a probe response capture, from the same AP 110 as the beacon capture given in FIG. 3, using the WIRESHARK® analyzer tool. By comparing FIG. 12 to FIG. 3 it can clearly be observed that the information details for using the Probe Response are the same for the purposes of fingerprinting as per this disclosure, to that for using the beacon. It is clear to persons skilled in the art that the preceding descriptions also fully describe the disclosure when using the Probe Response. However, the order and number of the information used in the probe response may be different to that used in the beacon, as can be seen by comparing FIG. 3 and FIG. 12. For example, the Traffic Indication Map (TIM) is not used in the probe response and in this particular example, the AP Channel Reports, which are present in the beacon FIG. 3 are not included in the probe response in FIG. 12. Hence the beacon, the probe response, or both may be used for establishing the AP fingerprint.

Figure 13:
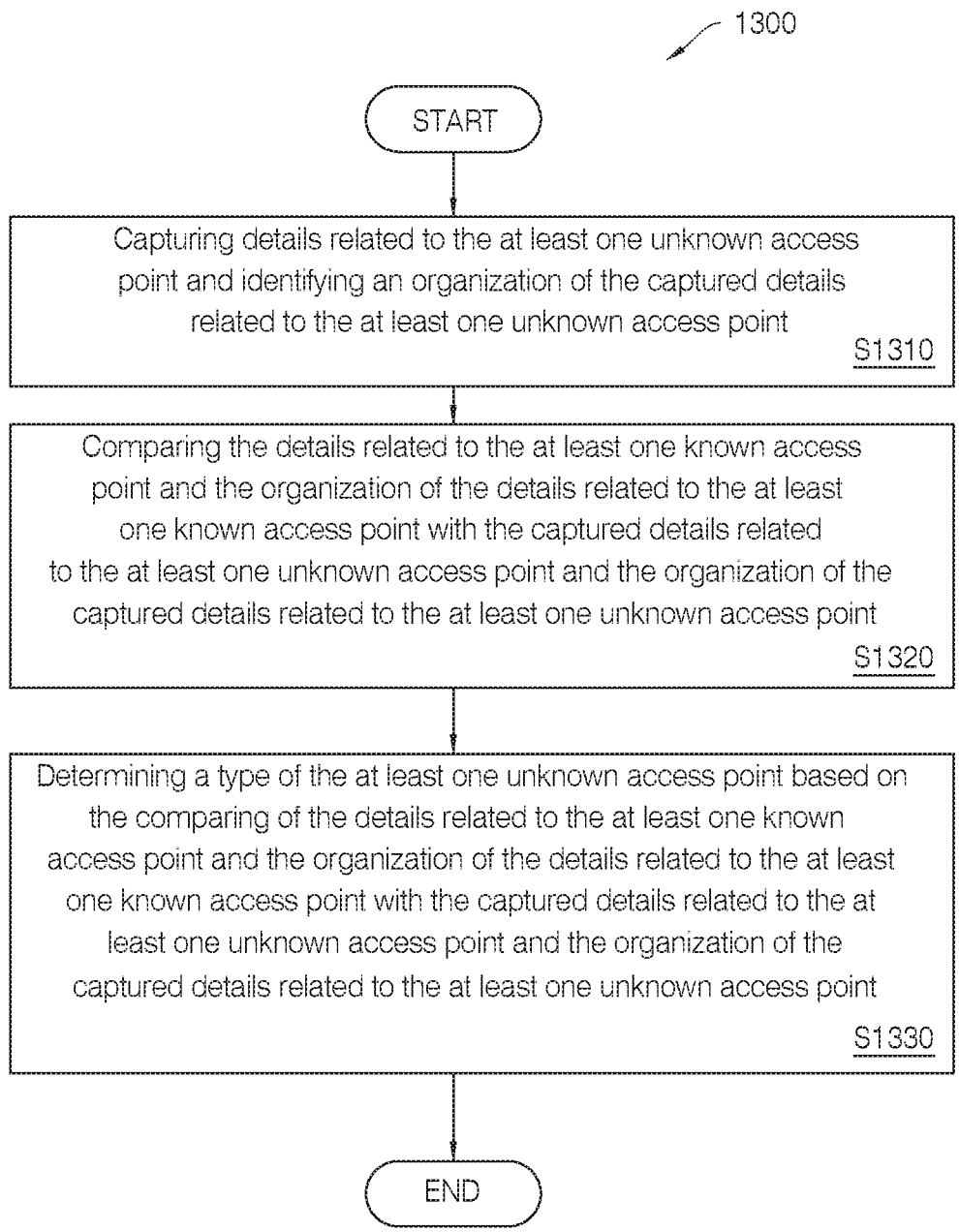
FIG. 13 illustrates a flow diagram according to an embodiment of the disclosure.

FIG. 13 is a flow diagram illustrating a method 1300 in, for example, a node identification system 500, for identifying at least one unknown access point (AP) 110 in a communications network using details related to at least one known AP 110 and organization of the details related to the at least one known AP 110. The steps of FIG. 13 may be performed, for example, by processor 532 in conjunction with matching code 537. In this embodiment, method 1300 includes capturing details related to the at least one unknown AP 110 and identifying an organization of the captured details related to the at least one unknown AP 110 (Block S1310), comparing the details related to the at least one known AP 110 and the organization of the details related to the at least one known AP 110 with the captured details related to the at least one unknown AP 110 and the organization of the captured details related to the at least one unknown AP 110 (Block S1320), and determining a type of the at least one unknown AP 110 based on the comparing of the details related to the at least one known AP 110 and the organization of the details related to the at least one known AP 110 with the captured details related to the at least one unknown AP 110 and the organization of the captured details related to the at least one unknown AP 110 (Block 1330). According to another embodiment, at least one of the details related to the at least one known AP 110 and the details related to the at least one unknown AP 110 is captured by a network protocol analyzer.

According to another embodiment, method 1300 further includes obtaining, by communications interface 531, known data about the at least one known AP 110, and creating, by processor 532, a fingerprint database, the fingerprint database comprising the organized details related to the at least one known AP 110 and the obtained known data about the at least one known AP 110. The fingerprint database could be, for example, database 536 shown in FIG. 5.

According to another embodiment, comparing the details related to the at least one known AP 110 and the organization of the details related to the at least one known AP 110 with the captured details related to the at least one unknown AP 110 and the organization of the captured details related to the at least one unknown AP 110 includes comparing the details related to the at least one unknown AP 110 and the organization of the details related to the at least one known AP 110 with the organized details related to the at least one known AP 110 and the obtained known data about the at least one known AP 110 stored in the fingerprint database 536.

According to another embodiment, the details related to the at least one known AP 110 includes at least one of an identity of a vendor of the at least one known AP 110, a model number of the at least one known AP 110, a chipset type of the at least one known AP 110, and a firmware version used in the at least one known AP 110.

According to another embodiment, if the details related to the at least one known AP 110 and the organization of the details related to the at least one known AP 110 does not match the captured details related to the at least one unknown AP 110 and the organization of the captured details related to the at least one unknown AP 110, the method further includes further comprising outputting a list of known APs 110 having details closest to details of the at least one unknown APs 110.

According to another embodiment, the method 1300 further includes storing the details related to the at least one unknown AP 110 and the organization of the details related to the at least one unknown AP 110 in an unknown access point database, comparing contents of the unknown access point database with future captured details related to other known APs 110 and organization of the future captured details related to the other known APS 110, identifying those details related to the at least one unknown AP 110 that match the future captured details related to the other known APs 110 based on comparing the contents of the unknown access point database with the future captured details related to other known APs 110 and the organization of the future captured details related to the other known APs 110, and updating the contents of the unknown access point database to include the identified details.

According to another embodiment, the details related to the at least one known AP 110 are captured from a beacon transmitted by the at least one known AP 110 and the details related to the at least one unknown AP 110 are captured from another beacon transmitted by the at least one unknown AP 110. In one embodiment, the details are captured by a network protocol analyzer.

According to another embodiment, the details related to the at least one known AP 110 are captured from a probe response transmitted by the at least one known AP 110 in response to a probe request and the details related to the at least one unknown AP 110 are captured from a probe response transmitted by the at least one unknown AP 110 in response to another probe request. In one embodiment, the details are captured by a network protocol analyzer. According to another embodiment, if a match is found between the details related to the at least one known AP 110 and the organization of the details related to the at least one known AP 110, and the captured details related to the at least one unknown AP 110 and the organization of the captured details related to the at least one unknown AP 110, the method further includes outputting information regarding the match to at least one of a display and a file.

Figure 14:
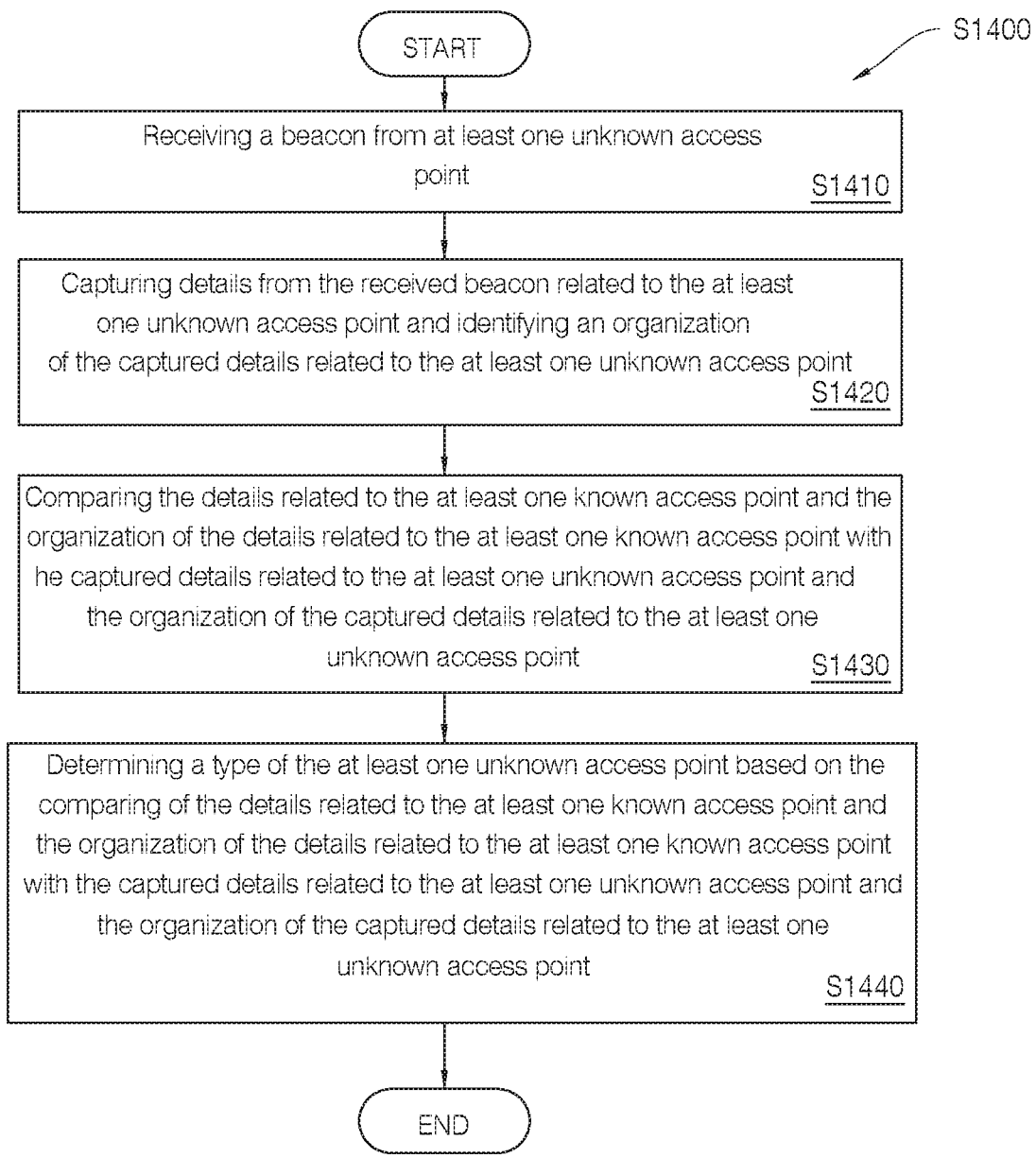
FIG. 14 illustrates a flow diagram according to an alternate embodiment of the present disclosure.

FIG. 14 is a flow diagram illustrating a method S1400 in, for example, in node identification system 500 for identifying at least one unknown AP 110 in a communications network using details related to at least one known AP 110 and organization of the details related to the at least one known AP 110, the details related to the at least one known AP 110 including at least one of an identity of a vendor of the at least one known AP 110, a model number of the at least one known AP 110, a chipset type of the at least one known AP 110, and a firmware version used in the at least one known AP 110. The method S1400 includes receiving a beacon from at least one unknown AP 110 (Block S1410), capturing details from the received beacon related to the at least one unknown AP 110 and identifying an organization of the captured details related to the at least one unknown AP 110 (Block S1420), comparing the details related to the at least one known AP 110 and the organization of the details related to the at least one known AP 110 with the captured details related to the at least one unknown AP 110 and the organization of the captured details related to the at least one unknown AP 110 (Block S1430), and determining a type of the at least one unknown AP 110 based on the comparing of the details related to the at least one known AP 110 and the organization of the details related to the at least one known AP 110 with the captured details related to the at least one unknown AP 110 and the organization of the captured details related to the at least one unknown AP 110 (Block S1440).

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the use of the beacon and/or the probe request, various details within the information elements in the beacon and/or probe request, the format and details of the database and the database query mechanism, the number of databases and their relationships to each other, the output and display of the results of the database query. Accordingly, the scope should be determined not by the embodiments illustrated, but by the claims and their legal equivalents.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope.

I claim:

1. A method in a node identification system for identifying at least one unknown access point in a communications network using details related to at least one known access point and organization of the details related to the at least one known access point, the method comprising:
    storing the organization of the details related to the at least one known access point together with the details related to the at least one known access point, the stored details including parameters associated with a type of the at least one known access point;
    capturing details related to the at least one unknown access point and identifying an organization of the captured details related to the at least one unknown access point;
    comparing the captured details and the organization of the captured details related to the at least one unknown access point with the stored details and the organization of the stored details related to the at least one known access point; and
    determining a type of the at least one unknown access point based on the comparing of the captured details and the organization of the captured details related to the at least one unknown access point to the stored details and the organization of the stored details related to the at least one known access point.

2. The method of claim 1, wherein at least one of the details related to the at least one known access point and the details related to the at least one unknown access point is captured by a network protocol analyzer.

3. The method of claim 1, further comprising:
obtaining known data about the at least one known access point; and
creating a fingerprint database, the fingerprint database comprising the organization of the stored details related to the at least one known access point and the obtained known data about the at least one known access point.

4. The method of claim 3, wherein comparing the captured details and the organization of the captured details related to the at least one unknown access point with the stored details and the organization of the stored details related to the at least one known access point comprises:
comparing the details related to the at least one unknown access point and the organization of the details related to the at least one unknown access point with the organized details related to the at least one known access point and the obtained known data about the at least one known access point stored in the fingerprint database.

5. The method of claim 1, wherein the details related to the at least one known access point includes at least one of an identity of a vendor of the at least one known access point, a model number of the at least one known access point, a chipset type of the at least one known access point, and a firmware version used in the at least one known access point.

6. The method of claim 1, wherein if the details related to the at least one known access point and the organization of the details related to the at least one known access point do not match the captured details related to the at least one unknown access point and the organization of the captured details related to the at least one unknown access point, further comprising outputting a list of known access points having details closest to details of the at least one unknown access points.

7. The method of claim 1, wherein the details related to the at least one known access point are captured from a beacon transmitted by the at least one known access point and the details related to the at least one unknown access point are captured from another beacon transmitted by the at least one unknown access point.

8. The method of claim 1, wherein the details related to the at least one known access point are captured from a probe response transmitted by the at least one known access point in response to a probe request and the details related to the at least one unknown access point are captured from another probe response transmitted by the at least one unknown access point in response to a probe request.

9. The method of claim 1, wherein if a match is found between the details related to the at least one known access point and the organization of the details related to the at least one known access point, and the captured details related to the at least one unknown access point and the organization of the captured details related to the at least one unknown access point, further comprising:
outputting information regarding the match to at least one of a display and a file.

10. A node identification system configured to identify at least one unknown access point in a communications network using details related to at least one known access point and organization of the details related to the at least one known access point, the node identification system comprising:
a communications interface configured to:
capture details related to the at least one unknown access point and identifying an organization of the captured details related to the at least one unknown access point; and
processing circuitry including a memory and a processor, the memory in communication with the processor, the memory having instructions that, when executed by the processor, configure the processor to:
compare the captured details and the organization of the captured details related to the at least one unknown access point with the details related to the at least one known access point, the details related to the at least one known access point including parameters associated with a type of the at least one known access point and the organization of the details related to the at least one known access point; and
determine a type of the at least one unknown access point based on the comparing of the captured details and the organization of the captured details related to the at least one unknown access point to the details related to the at least one known access point and the organization of the details related to the at least one known access point.

11. The node identification system of claim 10, wherein at least one of the details related to the at least one known access point and the details related to the at least one unknown access point is captured by a network protocol analyzer.

12. The node identification system of claim 10, wherein the processor is further configured to:
obtain known data about the at least one known access point; and
create a fingerprint database, the fingerprint database comprising the organization of the stored details related to the at least one known access point and the obtained known data about the at least one known access point.

13. The node identification system of claim 12, wherein comparing the details related to the at least one known access point and the organization of the details related to the at least one known access point with the captured details related to the at least one unknown access point and the organization of the captured details related to the at least one unknown access point comprises:
comparing the details related to the at least one unknown access point and the organization of the details related to the at least one unknown access point with the organized details related to the at least one known access point and the obtained known data about the at least one known access point stored in the fingerprint database.

14. The node identification system of claim 10, wherein the details related to the at least one known access point includes at least one of an identity of a vendor of the at least one known access point, a model number of the at least one known access point, a chipset type of the at least one known access point, and a firmware version used in the at least one known access point.

15. The node identification system of claim 10, wherein if the details related to the at least one known access point and the organization of the details related to the at least one known access point do not match the captured details related to the at least one unknown access point and the organization of the captured details related to the at least one unknown access point, further comprising outputting a list of known access points having details closest to details of the at least one unknown access points.

16. The node identification system of claim 10, wherein the details related to the at least one known access point are captured from a beacon transmitted by the at least one known access point and the details related to the at least one unknown access point are captured from another beacon transmitted by the at least one unknown access point.

17. The node identification system of claim 10, wherein the details related to the at least one known access point are captured from a probe response transmitted by the at least one known access point in response to a probe request and the details related to the at least one unknown access point are captured from another probe response transmitted by the at least one unknown access point in response to a probe request.

18. A method in a node identification system for identifying at least one unknown access point in a communications network using details related to at least one known access point and organization of the details related to the at least one known access point, the details related to the at least one known access point including at least one of an identity of a vendor of the at least one known access point, a model number of the at least one known access point, a chipset type of the at least one known access point, and a firmware version used in the at least one known access point the method comprising:

capturing the details related to the at least one known access point and identifying the organization of the details related to the at least one known access point;

storing the identified organization of the details related to the at least one known access point together with the details related to the at least one known access point, the stored details including parameters associated with a type of the at least one known access point;

receiving a beacon from at least one unknown access point;

capturing details from the received beacon related to the at least one unknown access point and identifying an organization of the captured details related to the at least one unknown access point;

comparing the captured details and the organization of the captured details related to the at least one unknown access point with the stored details related to the at least one known access point, the details related to the at least one known access point including the parameters associated with the type of the at least one known access point, and the organization of the details related to the at least one known access point; and determining a type of the at least one unknown access point based on the comparing of the captured details and the organization of the captured details related to the at least one unknown access point to the stored details and the organization of said details related to the at least one known access point.

* * * * *